United States Patent [19]

Hoess et al.

[11] Patent Number: 5,110,877
[45] Date of Patent: May 5, 1992

[54] METHOD FOR IMIDIZING AN ALKYL METHACRYLATE POLYMER

[75] Inventors: Werner Hoess, Griesheim; Heinz Vetter, Rossdorf; Manfred Brehm, Aschaffenburg; Guenter Schroeder, Ober-Ramstadt; Roland Reiner, Darmstadt, all of Fed. Rep. of Germany

[73] Assignee: Röhm GmbH, Darmstadt, Fed. Rep. of Germany

[21] Appl. No.: 650,399

[22] Filed: Feb. 1, 1991

[30] Foreign Application Priority Data

Feb. 1, 1990 [DE] Fed. Rep. of Germany ....... 4002904

[51] Int. Cl.$^5$ .............................................. C08F 8/32
[52] U.S. Cl. .................. 525/378; 525/329.5; 525/329.9; 525/330.5; 525/379
[58] Field of Search ................................ 525/378, 379

[56] References Cited

U.S. PATENT DOCUMENTS

| | | |
|---|---|---|
| 2,146,209 | 2/1939 | Graves .................................. 260/2 |
| 4,246,374 | 1/1981 | Kopchik ............................... 525/378 |
| 4,820,778 | 4/1989 | Ohtani et al. ....................... 525/380 |
| 4,927,893 | 5/1990 | Anzai et al. ......................... 525/378 |
| 4,954,575 | 9/1990 | Sasaki et al. ....................... 525/379 |
| 4,968,755 | 11/1990 | Canova et al. ..................... 525/379 |
| 5,013,774 | 5/1991 | Nishida et al. ..................... 525/379 |
| 5,023,302 | 6/1991 | Anzai et al. ...................... 525/329.9 |
| 5,045,604 | 9/1991 | Maurer ............................. 525/330.5 |

FOREIGN PATENT DOCUMENTS 1113308 8/1961 Fed. Rep. of Germany .
2652118 6/1977 Fed. Rep. of Germany .

*Primary Examiner*—Bernard Lipman

[57] ABSTRACT

In a process for imidizing an alkyl methacrylate polymer by reaction with a nitrogen-containing imidizing agent, the formation of carboxyl and anhydride groups is suppressed when a portion of the imidizing agent is added only after the previously added imidizing agent has been reacted at least partially, and particularly when the reaction with the imidizing agent is terminated before the polymer has been completely imidized.

13 Claims, No Drawings

METHOD FOR IMIDIZING AN ALKYL METHACRYLATE POLYMER

The present invention relates to a method for imidizing an alkyl methacrylate polymer by reaction with an imidizing agent containing nitrogen.

The reaction of alkyl acrylates and/or alkyl methacrylates with primary amines, or with derivatives of such amines which under the reaction conditions form primary amines or result in the same reaction products as these, has long been known. The reaction of the primary amines $R'-NH_2$ yields polymers with cyclic units of the structure

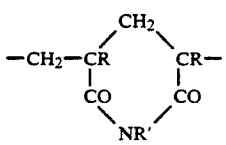

where R is a hydrogen atom when the structure represented is derived from acrylate units, or a methyl group when it is derived from methacrylate units. The cyclic unit represented by the formula is called an acrylimide or methacrylimide group. Therefore, nitrogen-containing compounds which react with units of alkyl acrylates and/or methacrylates to give acrylimide and/or methacrylimide groups are here generically called imidizing agents.

The partial or complete imidization of alkyl methacrylate polymers by reaction with a nitrogen-containing imidizing agent is known from U.S. Pat. No. 2,146,209, for example. The polymer is heated with the imidizing agent, in the presence or absence of a solvent, to temperatures from 140° C. to 250° C., optionally under pressure. According to German patent publication 1,113,308 a higher degree of imidization is achieved when the reaction is carried out in the presence of water at 130° C. to 160° C.

Imidized polymers having improved properties, such as better solubility and higher thermal stability, are obtained according to German patent publication 26 52 118 when the imidization is carried out in an extruder at 200° C. to 450° C. under substantially anhydrous conditions. This requirement is deemed satisfied when the water content of the reaction mixture is less than 2 percent by weight.

In all of the aforesaid processes, imidization is carried out by mixing the polymer with a given quantity of the imidizing agent and heating it, usually under pressure, until the final content of imide groups is obtained. As a rule, the imidizing agent is not converted quantitatively to imide groups. Complete imidization can be achieved only with a stoichiometric excess of the imidizing agent. If it is used in an exactly stoichiometric quantity, a polymer is obtained in which not all methacrylate units originally contained in it have been converted to methacrylimide units. When a less than stoichiometric quantity of imidizing agent is used, the quantity of methacrylimide units is always considerably less than the theoretically calculable quantity.

However, complete imidization is usually not desired. Pure polymethyl methacrylimide has a Vicat B softening point of 178° C. while the Vicat softening point of polymethyl methacrylate (PMMA) is 105° C. The softening temperatures of partially imidized polymethyl methacrylate are between these values. Frequently it is sought to obtain polymers containing from 30 to 85 base-mole percent of methacrylimide units (number of methacrylamide units per 100 moles of the repeating polymer unit, in this case methyl methacrylate having a molecular weight of 100) because such polymers are distinguished by characteristics particularly advantageous for their processing and use.

While a completely imidized polymer can be obtained when an excess of imidizing agent is used, it has not proved possible to convert polymethyl methacrylate into a polymer composed only of units of methyl methacrylate and methacrylimide by the use of a limited quantity of imidizing agent. Units of methacrylic acid and of methacrylic anhydride invariably are also present. Remarkably, this is the case even when the reaction is carried out in the complete absence of water. It would seem that in addition to the reaction of two vicinal methyl methacrylate units with a methylamine molecule to give a methacrylimide unit and two molecules of methanol, a side reaction of the same components takes place in which an alkyl radical of the ester group is transferred through N-alkylation to the nitrogen atom of the amine, with the formation of carboxyl groups or, through elimination of water between two carboxyl groups, anhydride groups. (See G. Schrader, Makromolekulare Chemie, vol. 96, pp. 227-244 [1966].) Di- and tri-methylamines are detectable as byproducts.

Even in minor amounts of 2 to 10 base-mole percent, for example, the carboxyl and anhydride groups have undesirable effects on the properties of the partially imidized polymer. Its weather and alkali resistance and its miscibility with other thermoplastic polymers are impaired. To overcome this drawback, the partially imidized polymers are, in accordance with European patent 216,505, subsequently reacted with an alkylating agent, for example, an orthoformate. The quantity of alkylating agent needed depends on the content of carboxyl and anhydride groups. This aftertreatment adds to the costs of the process.

The present invention has as its object suppression of the formation of carboxyl and anhydride groups during the imidization of an alkyl methacrylate polymer by reaction with a nitrogen-containing imidizing agent, thus permitting the subsequent use of alkylating agents to be dispensed with completely or partly.

Surprisingly, this can be accomplished simply by adding, during the reaction, a portion of the imidizing agent only after the previously added imidizing agent has been partially reacted. It would appear that while carboxyl and anhydride groups are indeed formed during the reaction of the first portion of the imidizing agent, they are preferentially reacted when a further portion of the imidizing agent is added, with carbonamide groups probably being formed in a first step, and in a second step, cyclic methacrylamide groups by condensation of such carbonamide groups with vicinal carbonamide, ester, or carboxyl groups. In addition, new carboxyl and anhydride groups may be formed, but their number will be smaller than it would be if the total amount of the imidizing agent were reacted all at once. If, on the other hand, a definite excess of imidizing agent is used at the outset, the reaction of carboxyl and anhydride groups formed intermediately is able to proceed until the entire polymer has been completely imidized. The method of the invention is therefore of importance especially when reaction with the imidizing agent is terminated before the polymer has been completely imidized.

While the mechanism outlined above has not been proved, observations are in good agreement with it. Advantageously, the amount of imidizing agent initially added has been reacted as completely as possible, but at any rate to the extent of more than 50 percent, before an additional amount is added. Advantageously, too, the initial amount of imidizing agent is larger than the subsequent additions. The molar ratio of imidizing agent to unreacted ester units is preferably about the same in every addition. The formation of carboxyl and anhydride groups can be suppressed very largely, though usually not completely, in this way. The carboxyl and anhydride groups remaining in the end will have only a negligible effect on the properties of the product or can be eliminated with relatively small amounts of alkylating agents.

Based on the stoichiometry, water should be formed during the reaction of carboxyl or anhydride groups with the imidizing agent, and particularly with the free amine. This might promote the formation of new carboxyl groups through the hydrolysis of ester groups. This unwanted effect can be avoided by removing the volatile reaction products formed from the reaction mixture each time before more imidizing agent is added. This can be done in a venting zone where, in addition to the water, mainly alkanol formed by aminolysis of the ester groups, unreacted residues of the amine, and di- and tri-alkylamines pass off as vapors. For further reaction, the polymer is again exposed, together with an additional portion of imidizing agent, to the conditions of temperature and pressure necessary for the reaction.

The reduction of the carboxyl and anhydride content achieved by method of the invention is illustrated by the comparative values which follow. Through the addition of 1.2 mole of methylamine/base-mole of polymethyl methacrylate (PMMA) at 245° C. and a reaction pressure of 200 bars, a polymer with about 70 weight percent of imide groups, 4 weight percent of acid groups, and 3 weight percent of anhydride groups, the remainder being ester groups, was obtained in one step.

On the other hand, when PMMA is reacted under the same conditions in each of four reaction steps with one half the base-molar amount of methylamine (i.e. 0.5 mole amine/equivalent of ester groups originally present), the contents of methacrylimide, methacrylic acid, and methacrylic anhydride units vary stepwise as follows:

|  | Imide groups wt. % | Acid groups wt. % | Anhydride groups wt. % |
| --- | --- | --- | --- |
| First step | 15 | 1.4 | 6.9 |
| Second step | 40 | 1.6 | 5.1 |
| Third step | 80 | 1.3 | 4.1 |
| Fourth step | 84 | 1.5 | 2.8 |

The partially imidized polymers obtained in the second to fourth steps have a considerably reduced combined carboxyl and anhydride content in comparison with polymers with the same imide content produced in one step.

The method of the invention may be carried out continuously or batchwise. In the latter case, a portion of the imidizing agent is added at the start of the reaction and the remainder is added gradually or in one or more portions after partial reaction of the initial amount. For example, the imidizing agent may be injected into the reactor with a pressure pump, evenly or cyclically in portions, after the reactor has been heated to the reaction temperature. Optionally, the gas phase accumulated in the reactor is partly or completely vented prior to every further addition of imidizing agent, the volatile reaction products formed up to that point thus being removed from the reaction mixture.

In continuous operation, the imidization is advantageously carried out in a tubular reactor, and the polymer and the imidizing agent are introduced continuously into the reactor. At a first inlet opening, the initial portion of the imidizing agent is mixed with the molten polymer. Further portions of the imidizing agent are introduced into the tubular reactor at one or more points where the previously introduced imidizing agent has been partially reacted. A single- or multi-screw extruder is preferably employed as tubular reactor. Here, too, pressure and venting zones may be alternated for the purpose of removing the volatile reaction products formed from the reaction mixture, which gradually moves forward in the extruder, prior to every further addition of imidizing agent.

In neither of these modes of operation is a given quantity of the starting polymer mixed all at once with the total amount of the imidizing agent which is to be reacted with it. Rather, that amount is divided into several portions which are added at different times or places. This is true regardless of the size of the total amount of the imidizing agent in relation to the quantity of polymer. For example, 1 base-mole of PMMA can be reacted all at once with 0.5 mole of imidizing agent if further amounts of the imidizing agent are subsequently added. On the other hand, if the total amount is only 0.5 mole, the portion used initially must be less than 0.5 mole. As a rule, the initial portion should not be more than 80 mole percent of the total amount, but should preferably be between 20 and 60 mole percent. If it is not added gradually and evenly, the remainder should preferably be distributed over from one to five portions to be added. Each portion advantageously is not more than 75 percent of the previously added portion. Uniform portions may be added in all stages, but portions which increase from stage to stage are to be avoided.

The reaction with the imidizing agent is preferably terminated before the polymer has been completely imidized. To this end, the imidizing agent is used in a total amount from 0.2 to 1.0 mole per base-mole of the ester units. (The term "base mole" refers to the amount of ester monomer on which the polymerized ester units are based.) Polymers are then obtained which comprise from 20 to 80 base-mole percent of cyclic methacrylimide units.

The starting materials and process conditions used in the method of the invention are the same as those employed in prior art imidizing processes. The characterization which follows summarizes the commonly used starting materials and process conditions, but should not be construed as a mandatory restriction.

The alkyl methacrylate polymer comprises at least 24, and generally more than 50, and preferably more than 80, and most preferably from 95 to 100, percent by weight of units of alkyl esters of methacrylic acid having from 1 to 4 carbon atoms in the alkyl group. Methyl methacrylate is preferred. Preferred polymers comprise at least 80 percent by weight of methyl methacrylate. Suitable comonomers are all monomers which are copolymerizable therewith, and particularly alkyl esters of acrylic acid having from 1 to 4 carbon atoms in the alkyl group, acrylic acid and/or methacrylic acid, acrylonitrile and/or methacrylonitrile, acrylamide and/or methacrylamide, and styrene. Thermoplastically processable polymers of this type having a reduced specific viscosity ranging from 20 to 92, and preferably from 50 to 80, ml/g, are preferred. They are preferably used in the form of a powder or as granules of an average particle size from 0.03 to 3 mm.

As a rule, ammonia, or preferably a primary aliphatic amine, and preferably an alkylamine having from 1 to 12 carbon atoms in the alkyl group, and in particular methylamine, is used as imidizing agent. Cycloaliphatic or araliphatic amines, such as cyclohexylamine or benzylamine, are also suitable. In place thereof, derivatives of ammonia or of a primary amine which act in the same way under the conditions of the imidizing process, that is, bring about imidization, may be used. These include the salts of ammonia or of primary amines with organic or inorganic acids such as hydrochloric acid, carbonic acid, formic acid, or acetic acid; ureas; thioureas; carbamates; guanidines; formamides; acetamides; amides of other aliphatic or aromatic carboxylic acids; and sulfonamides. If desired, mixtures of several imidizing agents may also be used.

The imidizing process is best carried out at temperatures above the melting point, or at least 20° C. above the Vicat B softening point, of the starting polymer. Better yet, a reaction temperature is chosen that is at least 20° C. above the softening point of the imidized polymer being produced. Since the Vicat softening point of the imidized polymer usually is the principal parameter of the process and the degree of imidization to be attained is based thereon, the requisite minimum temperature can also be readily determined. The temperature range from 140° C. to 400° C., and more particularly from 200° C. to 300° C., is preferred. Excessively high reaction temperatures will occasionally result in a lowering of the reduced viscosity due to partial chain breakage of the polymer. To avoid subjecting the polymer to greater thermal stresses than is necessary, the reaction temperature may be raised from stage to stage, starting from a level just above the melting point of the starting polymer, and only in the last stage allowed to exceed the softening point of the imidized end product by at least 20° C. Within each reaction stage, the operating pressure is preferably the prevailing pressure, which may range from 50 to 500 bars, while there may be complete or partial venting between the stages, as pointed out earlier. The temperature of the reaction mixture will then drop and must then again be increased to the required level. When more imidizing agent is added under reaction conditions, the pressure will of course have to be raised appropriately.

The reaction time depends on the reaction rate under the conditions employed. It may be considerably shorter after each addition of a portion of the imidizing agent than the reaction time that would be required for complete imidization, but should be long enough each time to permit partial conversion, and preferably better than 50 percent conversion, of each addition of imidizing agent. As a rule, from 10 seconds to 30 minutes, and preferably from 1 to 7 minutes, per stage of addition, or a residence time of the same length in continuous operation, will be sufficient.

If desired, the reaction may be carried out in one or more stages, or in all stages, in the presence of solvents or diluents, as known from U.S. Pat. No. 2,146,209, German patents 1,077,872 and 1,088,231, or European patent 234,726, for example. Suitable solvents and diluents are particularly those which are liquid at room temperature and volatile at elevated temperature and at normal or reduced pressure, and which can be readily separated from the imidized polymer. They may be solvents for the starting polymer or for the imidized polymer, or for both, optionally only under the reaction conditions; however, this is not a basic requirement. The solvents and diluents which are suitable for use include petroleum oils, aliphatic hydrocarbons, aromatics, alkanols, ethers, ketones, esters, halogenated hydrocarbons, and even water.

The last reaction stage is followed by venting, and the imidized polymer is then cooled. At the same time, the solvent or diluent which may have been used can be separated from the imidized polymer along with excess imidizing agent and eliminated alkanol. This process step will be particularly advantageous if the process is carried out at least in the last stage in a tubular reactor, and particularly in an extruder. The substances to be separated from the polymer may be taken off as liquids or vapors at one or more points before of the end of the tubular reactor where the polymer is still a melt. The first portion of these substances may be taken off under the full reaction pressure, and the last residues from a venting zone at reduced pressure. Prior art single-stage or multi-stage vented extruders may be employed for this purpose. Optionally, the entire reaction mixture may be discharged from a tubular reactor, devolatilized, cooled and comminuted, and only then separated from the secondary constituents. To this end, the cooled and comminuted polymer may be washed with a suitable solvent or with water.

The imidized product obtained may be processed conventionally, for example, thermoplastically. Because of its reduced content of carboxylic acid and anhydride groups, it is distinguished by improved miscibility and compatibility with other polymers, for example, polyamides or styrene-acrylonitrile copolymers. For the same reason, water absorption in a humid environment is lower by from 1 to 2 percent by weight. As a result, the likelihood of cracking caused by swelling stresses due to water absorption is also minimized.

A better understanding of the present invention and of its many advantages will be had from the following specific examples, given by way of illustration.

EXAMPLES

EXAMPLE 1—BATCHWISE OPERATION

In an extruder reactor, one half the stoichiometric amount of methylamine, based on the ester units present, is metered into a PMMA melt (reduced specific viscosity, 76 ml/g), at 200 bars and 250° C. After an average residence time from 5 to 7 minutes, the melt is discharged and devolatilized, with unreacted methylamine and the methanol split off during the reaction volatilizing. The melt is cooled and, after solidification, comminuted. The process is terminated after 50 kg of PMMA has been reacted.

In a second reaction stage, the partially imidized material obtained is again reacted in the same manner, the methylamine feed being reduced on the basis of the decreased ester group content. After a total of five reaction stages under identical conditions, a polymer with 80 weight percent of methacrylimide units, 1.3 weight percent of methacrylic acid units, and 2.0 weight percent of methacrylic anhydride units is obtained.

EXAMPLE 2—CONTINUOUS OPERATION

In an extruder reactor, 0.3 mole of the stoichiometric amount of methylamine, per mole (=100 g) of the methyl methacrylate ester units present in the polymer, is metered into a PMMA melt (reduced viscosity, 76 ml/g), at 200 bars and 250° C. At each of three further feed points, distributed at approximately equal intervals between the first feed point and the end of the screw, another 0.3 mole percent of methylamine, based on the moles of PMMA ester groups originally present, is metered in. After a total residence time of about 7 minutes, the melt is discharged and devolatilized, with unreacted methylamine and the methanol split off during the reaction volatilizing. The melt is cooled and, after solidification, comminuted. The polymer obtained contains 82 weight percent of methacrylimide units, 1.7 weight percent of methacrylic acid units, and 2.0 weight percent of methacrylic anhydride units.

For comparison, the same total amount of 1.2 moles per mole of methylamine per base-mole (=100 g) of ester groups is metered into the extruder at just one point under identical conditions of pressure and temperature. The polymer obtained in single stage operation contains 79 weight percent of methacrylimide units, 4.7 weight percent of methacrylic acid units, and 1.9 weight percent of methacrylic anhydride units. The higher content of carboxyl and anhydride groups has an adverse effect on miscibility of the product with other thermoplastics and increases water absorption in a humid environment.

Examples 3-7

200 g of polymethyl methacrylate (i.e. 2 base-moles) having a weight average molecular weight of 1.6 (10$^5$) g/mol and a reduced specific viscosity (viscosity number) of 70 ml/g were introduced into an autoclave having a volume of 2 liters, equipped with an internal temperature measuring device, impeller stirrer, and exhaust valve. 800 ml of N-methyl pyrrolidone were added as a solvent. The autoclave was then heated to an interior temperature of 205° C. with stirring.

A solution of 200 ml of N-methyl pyrrolidone and 86.25 ml of a 40% aqueous methylamine solution, corresponding to 1 mole of methylamine, was then introduced using a pump for high pressure liquid chromatography, over a first period of hours, variable with each Example and designated "a". Thereafter, the reagents were reacted for a second variable period of hours, designated "b", at 205° C., giving in each case a total reaction time of "a+b" hours.

After cooling of the autoclave with compressed air, the resulting polymer solution was mixed with a fivefold volume of a mixture of ethanol/water, weakly acidified with HCl to precipitate the polymer. The latter was washed with water and dissolved in a ten-fold volume of tetrahydrofuran. This was filtered and the polymer precipitated in a five-fold volume of water. The precipitated polymer was vacuum filtered, washed again with water, and dried to constant weight at 120° C.. The polymer obtained in this manner was then analyzed for its acid, imide, and ester content by titration and 1H-NMR. The results are reported in the following Table.

TABLE

| Ex. No. | moles amine/ moles PMMA | Reaction Time (a + b) hours | Content (weight percent) | | |
|---|---|---|---|---|---|
| | | | Imide | Acid | Ester |
| 3 | 1:2 | 0 + 7 | 66.4 | 18.8 | 14.8 |
| 4 | 1:2 | 2 + 5 | 79.4 | 9.0 | 11.6 |
| 5 | 1:2 | 6 + 1 | 80.3 | 6.1 | 13.6 |
| 6 | 0.8:2 | 6 + 1 | 67.2 | 2.7 | 30.3 |
| 7 | 1:2 | 2 + 0.5 | 70.9 | 6.5 | 22.6 |

Whereas the total amount of methylamine solution was added prior to heating, i.e. without any addition during reaction, being thus representative of the prior art, gave 18.8 weight percent of methacrylic acid units, the addition of amine over 2 hours (Example 4) or 6 hours (Example 5) gave products with only 9.0 weight percent or 6.1 weight percent of acid, respectively.

In Example 6, the addition over a period of 6 hours of only 0.8 mole of methylamine, instead of 1 mole, led to a further decrease in the amine concentration at a given time during the reaction and only 2.7 weight percent of acid was found in the polymer.

In Example 7, the reaction time "b" was reduced to only 0.5 hour. In comparison with Example 4, a further reduction in acid from 9.0 to 6.5 weight percent was achieved because the time available for acid formation was reduced overall.

What is claimed is:

1. A method for imidizing an alkyl methacrylate polymer which comprises reacting said polymer with an imidizing agent containing nitrogen by reacting a portion of said imidizing agent with said polymer and then adding further imidizing agent only after the previously added imidizing agent has been reacted completely or at least partially.

2. A method as claim 1 wherein the reaction of polymer with the imidizing agent is terminated before the polymer has been completely imidized.

3. A method as in claim 1 wherein said imidization is carried out batchwise and a portion of the imidizing agent is added at the start of the reaction and the remainder is added gradually or in one or more portions after at least partial reaction of the initial amount.

4. A method as in claim 1 wherein imidization is carried out continuously in a tubular reactor into which the polymer and the imidizing agent are introduced continuously, a portion of the imidizing agent being introduced into the tubular reactor at at least one point where previously introduced imidizing agent has been at least partially reacted.

5. A method as in claim 4 wherein said tubular reactor is a single-screw or multi-screw extruder.

6. A method as in claim 4 wherein portion of the product discharged from the tubular reactor is recycled to the tubular reactor at a feed point, or upstream of a feed point, for the imidizing agent.

7. A method as in claim 1 wherein a further portion of the imidizing agent is added after more than 50 percent of the previously added portion of imidizing agent has been reacted.

8. A method as in claim 1 wherein the imidizing agent is used in a total amount which is from 0.2 to 0.8 mole per base-mole of the ester units present in said polymer.

9. A method as defined in claim 1 wherein a member selected from the group consisting of ammonia, primary aliphatic amines, ureas and thioureas of such amines, and salts or carbamates of such amines, is used as the imidizing agent.

10. A method as in claim 9 wherein the volatile reaction products formed by prior reaction are removed from the reaction mixture prior to the addition of a further portion of imidizing agent.

11. A method as in claim 9 wherein a portion of the product discharged from the tubular reactor is recycled to the tubular reactor at a feed point, or upstream of a feed point, for the imidizing agent.

12. A method as in claim 9 wherein volatile reaction products are removed from the reaction mixture as vapors.

13. A method as in claim 1 wherein the imidization is terminated when the amount of cyclic alkyl methacrylimide units formed by the imidizing reaction is from 20 to 80 base-mole percent.

* * * * *